United States Patent [19]

Tai et al.

[11] Patent Number: 5,446,561
[45] Date of Patent: Aug. 29, 1995

[54] METHOD AND APPARATUS FOR DIGITAL SCALE HALFTONING WITH VARIABLE SCREEN STRUCTURE FOR ELECTROPHOTOGRAPHIC PRINTING DEVICES

[75] Inventors: Hwai-Tzuu Tai, Rochester; Issac I. Ajewole, Greece, both of N.Y.

[73] Assignee: Eastman Kodak Company, Rochester, N.Y.

[21] Appl. No.: 207,507

[22] Filed: Mar. 8, 1994

[51] Int. Cl.$^6$ ............................................. H04N 1/40
[52] U.S. Cl. .................... 358/445; 358/448; 358/457; 358/465
[58] Field of Search ............... 358/445, 448, 453, 454, 358/455, 456, 457, 465, 466, 467

[56] References Cited

U.S. PATENT DOCUMENTS

| | | | |
|---|---|---|---|
| 4,680,645 | 7/1987 | Dispoto et al. | 358/459 |
| 5,045,952 | 9/1991 | Eschbach | 358/447 |
| 5,055,942 | 10/1991 | Levien | 358/456 |
| 5,130,819 | 7/1992 | Ohta | 358/445 |
| 5,260,807 | 11/1993 | Tai | 358/466 |
| 5,268,774 | 12/1993 | Eschbach | 358/445 |
| 5,325,211 | 6/1994 | Eschbach | 358/466 |

*Primary Examiner*—Edward L. Coles, Sr.
*Assistant Examiner*—Kimberly A. Williams
*Attorney, Agent, or Firm*—Norman Rushefsky

[57] ABSTRACT

A method and apparatus for modifying a digitized image in which the digitized image is received as input pixel values for a plurality of pixels, first selects an unprocessed one of the pixels to be a current pixel. The current pixel is modified by adding a total error value and a screen frequency component to the input pixel value of the current pixel to produce a modified current pixel value. The modified current pixel value is thresholded to produce an output pixel value for the current pixel, which becomes a processed pixel. The output pixel value is then mapped into an image range, and a total error incurred for the processed pixel caused by the mapping is determined. The total error incurred is distributed to at least one of the other of the plurality of pixels that is an unprocessed pixel. The procedure is repeated for each pixel in the plurality of pixels to provide a modified digitized image.

21 Claims, 8 Drawing Sheets

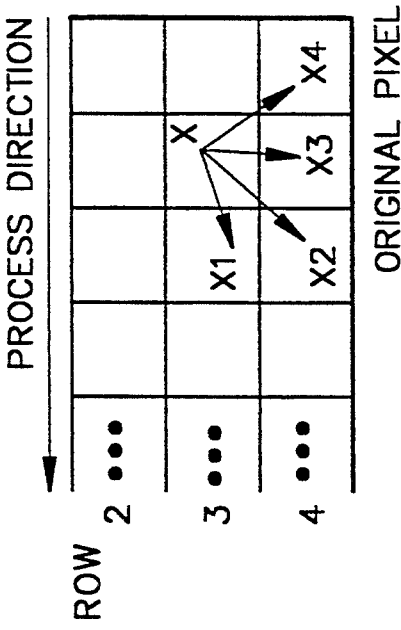
FIGURE 3A
FIGURE 3B
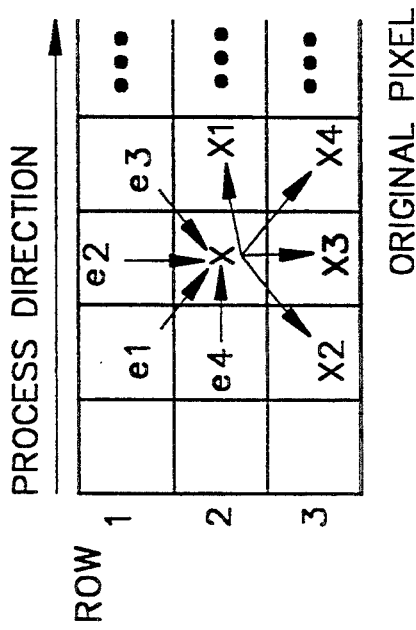
FIGURE 4A
FIGURE 4B

```
2 3 2 0 0 0 2 2 0 0 1 3 2 0 0 0 1 3 3 0 0 0 2 2 0 0
0 2 2 0 0 2 1 0 0 1 1 1 0 0 0 2 1 0 0 0 0 1 1 1 0 0
1 0 0 0 1 3 0 0 1 3 1 0 0 2 3 2 0 0 0 2 3 2 0 0 1 3
2 0 0 2 1 0 0 1 1 0 0 2 2 0 0 0 0 2 0 0 0 0 0 2 1 0
0 0 2 3 0 0 0 3 3 0 0 1 2 0 0 0 3 2 1 0 0 2 2 0 0 0
0 0 1 0 0 2 1 0 0 0 3 0 0 2 3 3 0 0 0 1 3 1 0 0 0 0
3 3 0 0 2 3 0 0 0 2 3 0 0 0 0 2 1 0 0 0 1 0 0 2 3 0
3 1 0 0 2 0 0 2 1 0 0 1 3 1 0 0 2 3 2 0 0 1 1 0 2 2
0 0 1 3 1 0 0 3 3 0 0 0 2 2 1 0 0 0 0 0 3 2 0 0 0 0
0 0 1 2 0 0 1 0 0 1 3 0 0 0 1 3 1 0 1 3 0 0 0 1 1 1
2 2 0 0 0 3 3 0 0 0 3 2 0 0 0 1 0 0 2 3 0 0 0 2 3 1
3 3 0 0 0 0 0 0 2 0 0 0 3 3 0 0 1 2 0 0 0 2 1 0 0 1
0 0 0 3 3 0 0 1 3 2 0 0 1 0 0 1 2 1 0 0 0 3 2 0 0 1
0 0 0 0 1 1 1 0 0 1 1 2 0 0 2 2 0 0 1 2 0 0 0 2 2 0
0 3 2 0 0 3 3 0 0 1 2 0 0 2 2 0 0 0 0 3 2 0 0 2 2 0
2 2 0 0 0 0 0 1 3 0 0 0 2 2 0 0 2 3 0 0 0 1 2 0 0 1
0 0 0 3 3 0 0 1 2 0 0 2 2 0 0 0 2 2 0 0 0 3 2 0 0 1
0 0 0 1 1 0 1 2 0 0 1 3 0 0 0 2 0 0 0 3 1 0 0 0 1 0
0 3 1 0 0 2 3 0 0 3 1 0 0 0 3 3 0 0 1 3 0 0 0 0 3 3
0 3 1 0 0 0 1 0 0 3 0 0 0 1 0 0 0 3 1 0 0 3 3 0 0 0
0 0 0 1 3 0 0 3 1 0 0 0 3 3 0 0 1 3 0 0 0 1 1 0 0 0
3 0 0 0 3 0 0 2 1 0 1 1 0 0 0 3 1 0 0 3 3 0 0 1 3 2
0 0 2 0 0 1 1 0 0 0 3 2 0 0 1 3 0 0 0 1 1 0 0 0 2 1
0 1 3 1 0 1 3 0 0 0 1 0 1 2 0 0 0 3 3 0 0 1 3 1 0 0
2 0 0 2 0 0 0 0 3 3 0 0 2 3 0 0 1 2 0 0 0 2 3 0 0 0
2 1 0 1 3 2 0 0 1 1 0 0 0 0 1 3 1 0 0 1 2 0 0 0 3 1
1 3 0 0 1 1 0 0 0 0 3 3 1 0 1 2 0 0 0 3 2 0 0 1 3 0
0 1 1 0 0 1 3 3 0 0 0 0 2 1 0 0 1 3 0 0 0 0 1 2 0 0
0 0 1 3 2 0 0 1 1 1 0 0 2 1 0 0 2 3 0 0 0 3 2 0 0 3
1 1 0 0 1 1 0 0 2 3 0 0 1 1 1 0 0 0 1 3 0 0 0 1 1 1
3 3 0 0 0 3 3 0 0 0 2 1 0 0 3 3 0 0 1 3 0 0 0 3 2 0
0 0 1 3 0 0 0 1 2 0 0 3 1 0 0 0 2 3 0 0 0 3 2 0 0 0
0 0 2 3 0 0 0 3 3 0 0 1 1 1 0 0 1 0 0 0 2 2 0 0 1 3
3 0 0 0 0 2 0 0 0 1 3 0 0 2 3 1 0 0 2 1 0 0 0 1 2 3
2 1 0 0 1 3 2 0 0 2 3 0 0 0 0 0 0 0 3 3 0 0 1 3 1 0 0
0 2 3 0 0 1 2 1 0 0 0 2 3 2 0 0 1 1 0 0 2 2 0 0 0 0
```

IRREGULAR SCREEN STRUCTURE

LEVEL 0 : WHITE
1
2
3 : BLACK

FIG. 6A

ILLUSTRATES

REGULAR SCREEN STRUCTURE

FIG. 6B

METHOD AND APPARATUS FOR DIGITAL SCALE HALFTONING WITH VARIABLE SCREEN STRUCTURE FOR ELECTROPHOTOGRAPHIC PRINTING DEVICES

BACKGROUND OF THE INVENTION

1. Field of the Invention

The present invention relates to the field of encoding pictorial imagery for reproduction on display or printing systems, and more particularly, to method and apparatus for digital gray scale halftoning of images.

2. Description Relative to the Prior Art

In the area of digital printing (the term "printing" is used to encompass both printing and displaying throughout), gray level has been achieved in a number of different manners. The representation of the intensity, i.e., the gray level, of a color by binary displays and printers has been the object of a variety of algorithms. Binary displays and printers are capable of making a mark, usually in the form of a dot, of a given, uniform size and a specified resolution in marks per unit lengths, typically dots per inch. It has been common to place the marks according to a variety of geometrical patterns such that a group of marks when seen by the eye gives a rendition of an intermediate color tone between the color of the background (usually white paper stock) and total coverage, or solid density.

Continuous tone images contain an apparent continuum of gray levels. As an approximation to continuous tone images, pictorial imagery has been represented via binary halftone technologies. In order to record or display a halftone image with a scanning system, one cell or super pixel of the recording or display surface consists of a jxk matrix of sub-elements where j and k are positive integers. A halftone image is reproduced by printing the respective sub-elements or leaving them blank, in other words, by suitably distributing the printed marks. Each sub-element, or dot is the same size.

A different method of producing gray levels is provided by gray level printing. In such a method, each pixel has the capability to be rendered in one of several different dot sizes. The dot size for a grey level pixel is represented by a grey level output pixel value which is used to determine an exposure time for recording that pixel by say an LED recording element corresponding to that pixel. The longer the exposure time, the more toner is attracted to that particular pixel. See, for example, U.S. Pat. No. 4,680,645 for a method of rendering gray scale images with variable dot sizes.

In gray scale rendering techniques, the proper dot growth patterns are constructed within a template to optimize and stabilize the electrophotographic process. However, this produces screens of fixed frequencies because of the template or cell characteristic. For a given resolution, finer screens can be produced, but at the expense of rendering levels. The present invention seeks to avoid the shortcoming of the template approach through an error-diffusion technique.

Error-diffusion has been used extensively in certain reproduction methods to produce images with acceptable quality. This technique is very good at reproducing the fine details of images. However, the dots produced by error-diffusion are generally too small to be reproduced sufficiently accurately by most marking devices, in particular, electrophotographic marking devices. This shortcoming causes unstable tone scale variation in the picture. This shortcoming and the "wormy" patterns are characteristic of the images produced by error diffusion.

A method has been described which applies the error diffusion technique to binary halftoning. In this method, described in U.S. Pat. 5,055,942, to Levien, the size of superpixels are varied by varying the number of dots within a variable sized unscreened superpixel. Thus, instead of varying the sizes of the individual dots as in gray scale halftoning, Levien provides for binary halftoning in which either a dot is printed or not, and provides gray scale by varying the number of dots in the plurality of dots. The algorithm Levien uses in his error diffusion technique is based upon this binary halftoning, such that each dot represents either a zero or a one. The limitation to binary values of the individual dots produces a less accurate reproduction than a method allowing multiple bit (and dot sizes) for each dot.

SUMMARY OF THE INVENTION

There is a need for an improved method and a device which applies an error diffusion technique to gray scale halftoning. Such a technique would allow a multi-bit gray scale halftoning rendered image to be of very high quality. This permits a two-bit halftone image to be produced that is of higher quality than a binary halftoned image produced with an error diffusion technique.

This and other needs are met by the present invention which provides a method for modifying a digitized image comprising the steps of receiving the digitized image as signals representing input pixel values for a plurality of pixels; selecting an unprocessed one of said pixels to be a current pixel; modifying the current pixel by adding an error value and a screen frequency component to the input pixel value of the current pixel to produce a modified current pixel value; thresholding the modified current pixel value to produce a grey level output pixel value for the current pixel, which becomes a processed pixel; mapping the output pixel value into a value range; determining an error incurred for the processed pixel that is related to the mapping; distributing the error incurred to at least one of the other of said plurality of pixels that is an unprocessed pixel; and repeating certain of the above steps for each pixel in the plurality of pixels to thereby provide a modified digitized image.

In accordance with another aspect of the invention, there is provided a method and an apparatus for reproducing an image comprising means for receiving a digitized image having input pixel values; means for modifying the input pixel value of each pixel in the digitized image as a function of the input pixel value, a total error diffused to each pixel from previous pixels, and a screen frequency component to form a grey level output pixel value for each pixel; and means for reproducing the image with the output pixel values.

The present invention provides the advantages of error diffusion to gray scale halftoning so that the dots may be reproduced sufficiently accurately by marking devices such as electrophotographic marking devices. This application of error diffusion to gray scale halftoning overcomes the wormy patterns that are characteristic of images produced by error diffusion.

Other objects, advantages and novel features of the present invention will become apparent from the following detailed description of the invention when con-

BRIEF DESCRIPTION OF THE DRAWINGS

FIG. 3a illustrates schematically an original pixel to be processed of an even row and neighboring pixels.

FIG. 3b illustrates the original pixel of FIG. 3a after it has been processed.

FIG. 4a illustrates schematically an original pixel to be processed of an odd row and neighboring pixels.

FIG. 4b illustrates the original pixel of FIG. 4a after it has been processed.

FIG. 6a illustrates an exemplary dot structure created by the embodiments of FIGS. 1 and 2 to produce the image with the variable screen structure of FIG. 5a. The dot structure shown features an irregular screen structure with o designating white and 1, 2 and 3 designating larger (darker) dots.

FIG. 6b illustrates an exemplary dot structure created by the prior art to produce the image with the fixed screen structure of FIG. 5b.

DETAILED DESCRIPTION OF THE PREFERRED EMBODIMENTS

Figure 1:
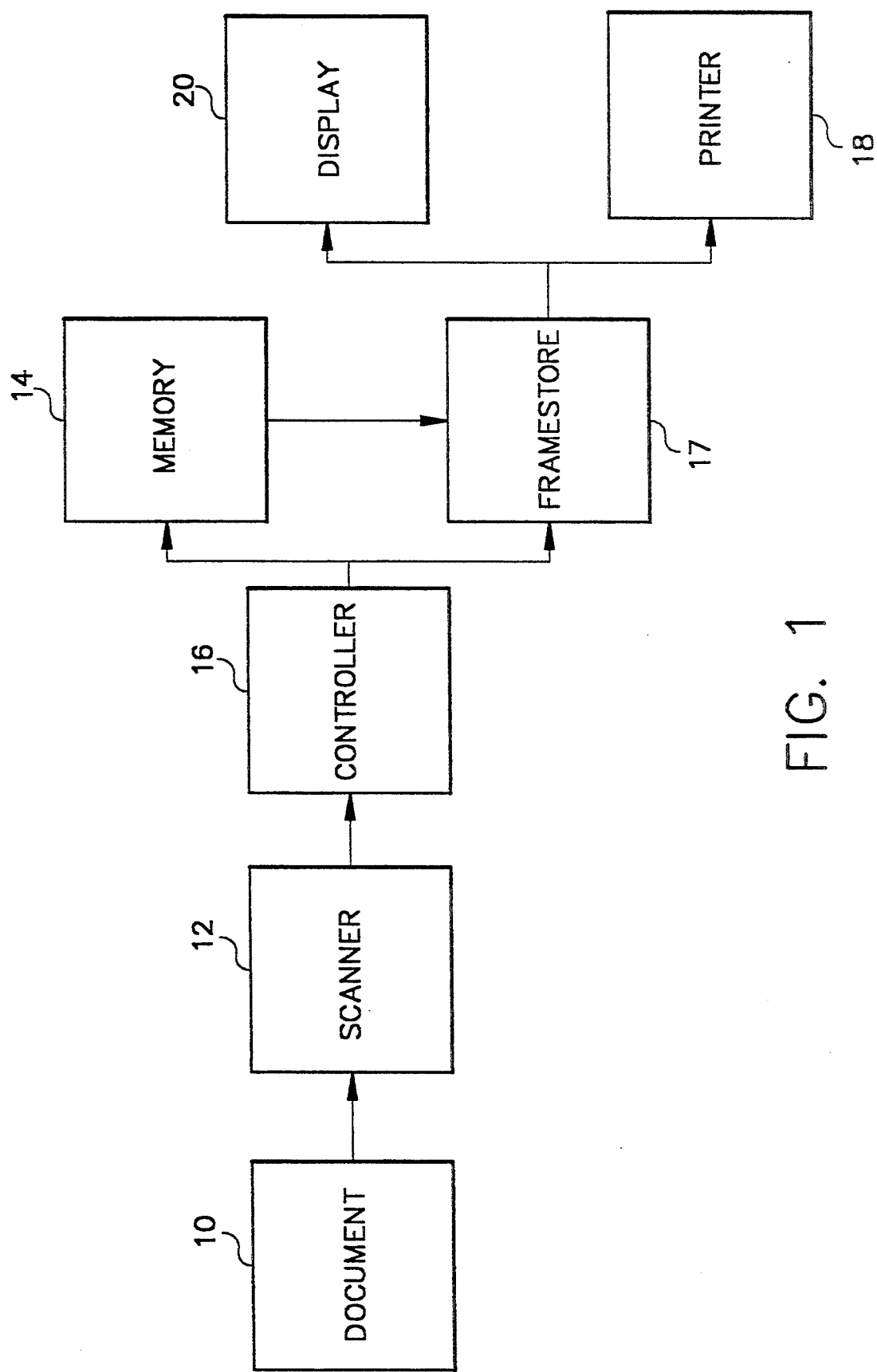
FIG. 1 is a block diagram of an apparatus to reproduce an image, constructed in accordance with an embodiment of the present invention.

FIG. 1 illustrates an apparatus which reproduces a document. The document can contain different types of images on the same document. For example, document 10 may contain both text and continuous tone areas, and it may also contain halftone areas.

Document 10 is scanned and digitized by a conventional scanner 12, which operates to provide digital signals representative of the densities of the areas of the document 10 corresponding to a pixel. These signals are sent to a memory (or buffer) 14. Under the direction of a controller 16, the signals maybe modified and provided as gray level signals for each pixel through a frame store 17 to a printer 18 and/or a display 20. The printer 18 and/or display 20 would then reproduce the document 10 by energizing each of the individual pixels according to the gray levels as modified (or not modified) by the controller 16. The memory 14, the controller 16, the frame store 17, the printer 18 and the display 20 are of conventional hardware design. Specific implementation blocks within the controller 16 will be described in more detail below and in conjunction with the process of the present invention according to FIG. 2.

In a conventional error diffusion technique, each pixel is modified and guantized. The resulting error is then computed and diffused over a given number of future pixels. The modified input pixel has two components: the original input pixel value X(n) and the total error Xe(N,n) diffused to that pixel from the previous N pixels. While this pre-guantization modification usually produces finely detailed images, the dots which form the images are generally broken up and sometimes too small to be accurately reproduced by the marking engine, particularly electrophotographic marking devices. This is because in the modification step and subsequent thresholding, no attempt is made to relate ("join") the current pixel with previously thresholded pixels. In the present invention, the value of the current pixel is modified in a manner that leads to more stable dots and less wormy appearance than is characteristic of conventional error diffusion images.

In the present invention, processed pixel Y, which will be reproduced by the marking engine, is a function of the value of the original input pixel value X(n), the total error Xe(N,n) diffused to that pixel from the previous N pixels, and a screen frequency or dot structure component Xf(N,n). The component Xf is a function of N previously guantized neighboring pixels and helps to relate or connect the dots to one another, therefore stabilizing them. In the prior art methods of error diffusion, the screen frequency component Xf(N,n) is not considered.

A basic description of the present invention is set forth below, with a more detailed exemplary implementation of the process of the present invention following. In the following description of the present invention, a one-dimensional case for a two-bit gray scale is used. Thresholds T1(n), T2(n), T3(n) are used, where T1(n) is less than T2(n) and T2(n) is less than T3(n). The modified version of the input pixel X(n) is denoted by X'(n). The basic steps involved in the error diffusion technique of the present invention are:

1. Modify the current pixel X(n) as follows:

$$X'(n) = X(n) + Xe(N,n) + Xf(N,n)$$

where:

Xe(N,n) = sum of error diffused from N previously processed neighboring pixels; and Xf(n) = frequency component based on N previously processed pixels.

2. The modified current pixel is thresholded:

$$Y(n) = 0, \text{ for } X'(n) < T1(n);$$

$$Y(n) = 1, \text{ for } T1(n) <= X'(n) < T2(n);$$

$$Y(n) = 2, \text{ for } T2(n) <= X'(n) < T3(n);$$

$$Y(n) = 3, \text{ for } X'(n) >= T3(n);$$

where Y(n) is the rendered output value for the current pixel.

3. Compute the error E(n) incurred for the current pixel;

$$E(n) = X(n) + Xe(N,n) - S[Y(n)]$$

where S [] is a mapping of the output Y(n) into a proper value range (0 to 255).

In step 3, the screen frequency control parameter Xf(n) does not feature in the error computation. It is used only in the thresholding step to control the dot structure.

4. Diffuse the error E(n) over M neighboring but not as yet processed pixels in a weighted manner. This adds a fraction of the error for E(n) to the value of each of M future pixels and builds up the error component Xe() of this particular pixel;

$$Xe(ni) = B(i)*E(n), i = 1 \ldots M$$

The B(i)'s are the weighting coefficients which must add up to 1. Note that M and N are positive integers greater than one and M and N may be equal.

As one of ordinary skill in the art will recognize, the above algorithm can be extended to two dimensions in a straightforward manner. The summation in step 1 and the frequency component will be over a window extending over N previous lines and N pixels on either side of the current pixel. For step 4, the window will be over M, future lines and M pixels on either side of the current pixel. Thus a single window of size $(N+1)\times(N+1)$ can be used for both steps.

The following specific implementation is an exemplary embodiment of the present invention utilizing the above described steps.

FIG. 3a illustrates the original pixel X for an even row, while FIG. 3b shows a processed pixel Y for an even row. FIG. 4a illustrates an original pixel X for an odd row, while FIG. 4b illustrates a processed pixel for this odd row. As an exemplary embodiment, the process proceeds to the right in even rows, and to the left in odd rows. However, other directions of processing can be used without departing from the scope of the invention.

Figure 2A:
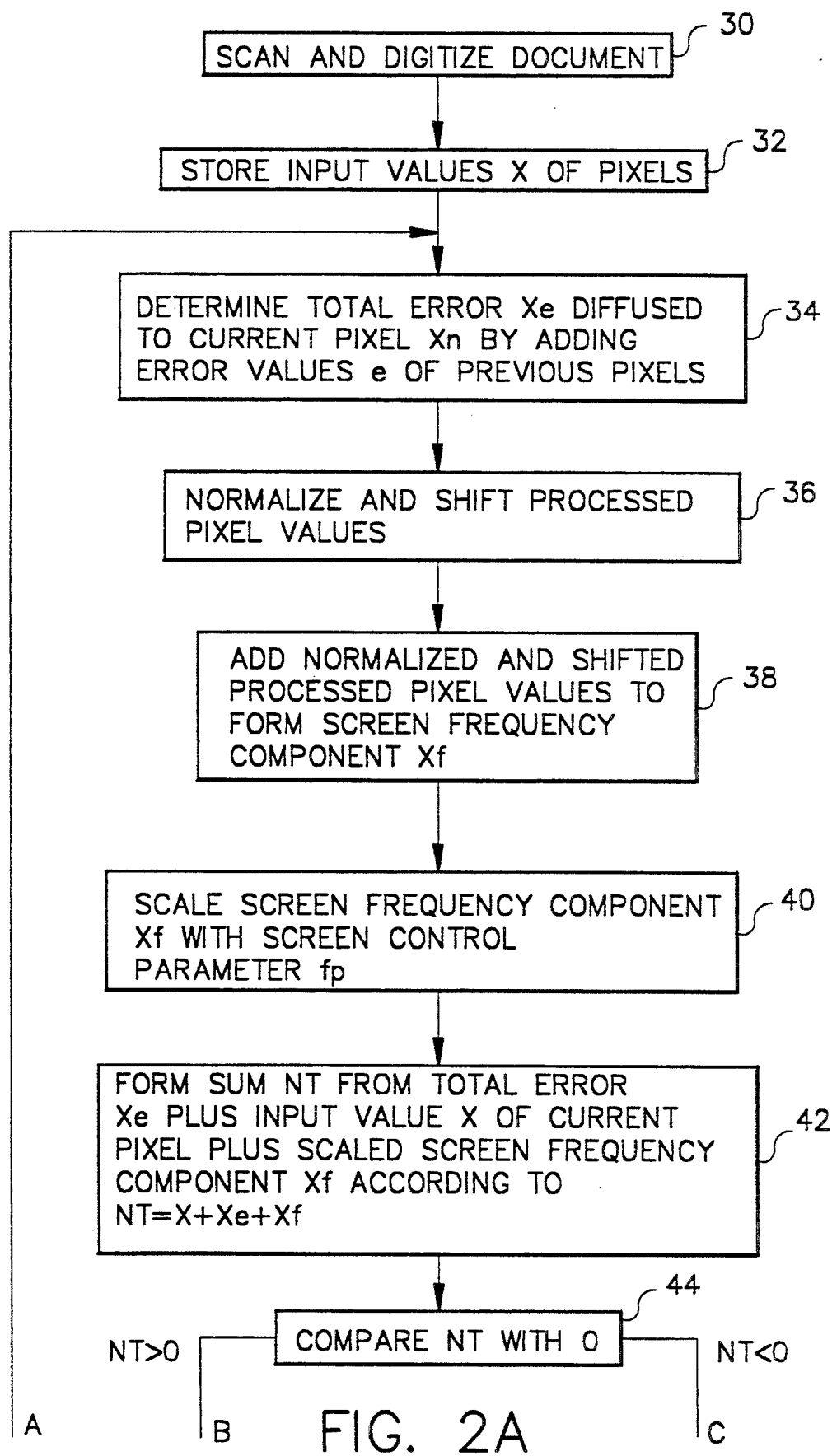
FIG. 2 shows a flow chart of the process according to an embodiment of the present invention.
Figure 2B:
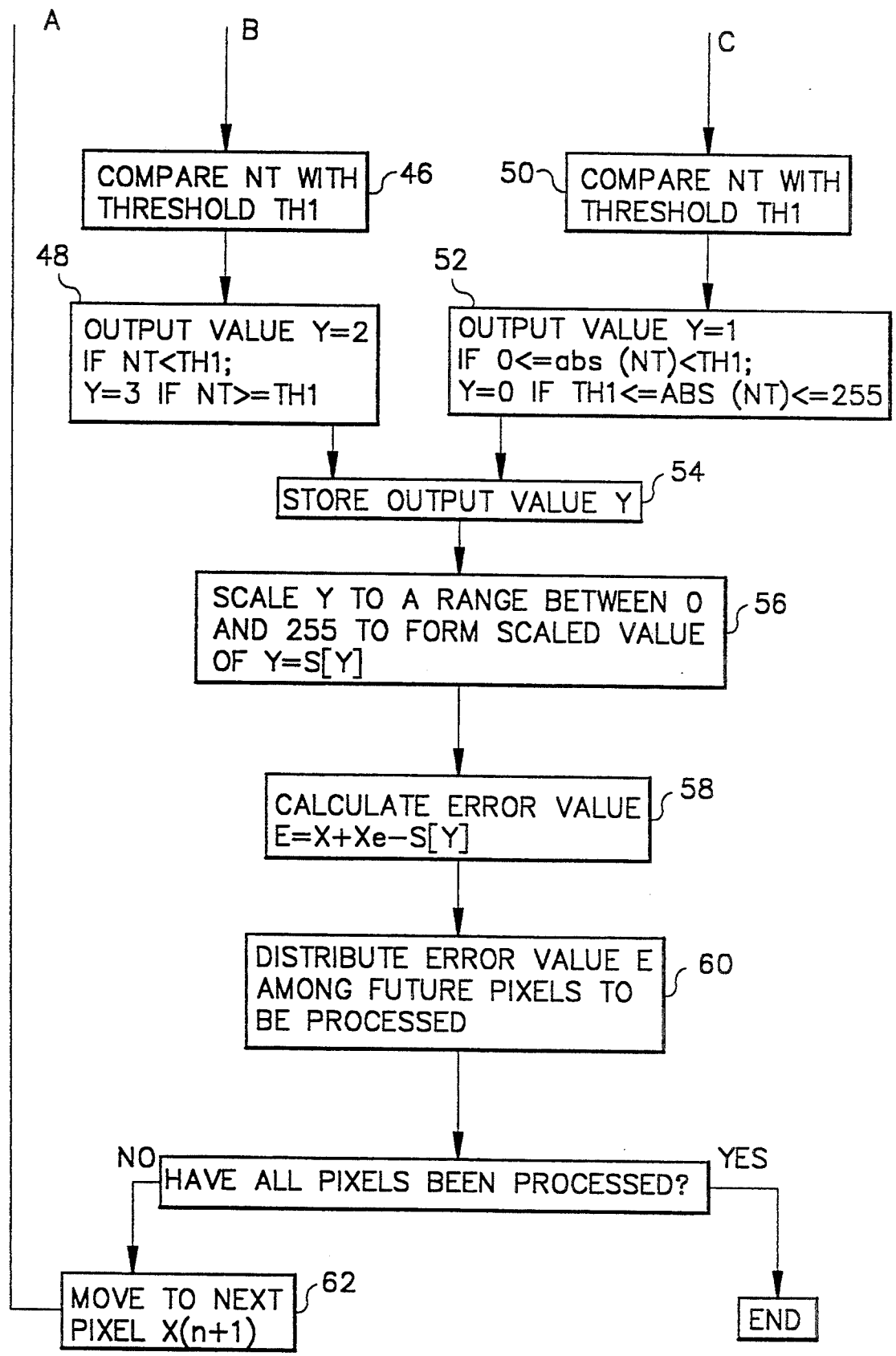
Figure 5A:
FIG. 5a illustrates an image with a variable screen structure produced by the process of the present invention according to FIG. 2 and the device of FIG. 1.
Figure 5B:
FIG. 5b illustrates an image with a fixed screen structure produced by a prior art method.

As shown in the embodiment of the method illustrated in FIG. 2, the document 10 is scanned and digitized in step 30. Input values for each of the pixels in the image are stored in step 32.

The total error Xe that is contributing to the current pixel X is determined from the error in the previously processed pixels. This is merely an addition of the error values e1, e2, e3, e4 to form the sum Xe, performed in step 34. This error value Xe may be either positive or negative.

The values for Y(n) (the previously processed pixels) are between 0 and 3 for a two-bit output, thus $0<=Y(n)<=3$. The values of previously processed pixels Y1–Y4 are in step 36 normalized to 1, by dividing by 3 in this example, and shifted by subtracting one-half, for example, to $-0.5<=Y(n)<=0.5$. These normalized and shifted output values are then added together in step 38. According to the designer's choice, only two of the values Y2' and Y4' can be added together, or all of the output values Y1', Y2', Y3', Y4' can be added together and labeled as Xf. This value Xf is the screen frequency component.

The screen frequency component Xf is then scaled or multiplied in step 40 with a screen control parameter (fp). This screen control parameter fp is determinable by the choice of the system user. The smaller the value of fp, the higher will be the screen frequency. The larger the value of fp, the lower will be the screen frequency. In the exemplary embodiment, $0<fp<255$. For example, if $fp=128$, then $-128<=$ scaled $Xf<=128$, where only two normalized and shifted pixels are added to define Xf.

In step 42, the scaled frequency component Xf is added to error value Xe and this sum is added to the original input pixel value X to form a sum NT. In step 44, NT is tested for being either positive or negative. If NT is positive, the value of NT is compared with a threshold TH1 in step 46. If NT is below the threshold TH1, a pixel value of 2 is the output Y of the now processed pixel. If the value NT is greater than the threshold value TH1, then the pixel value will be selected to be 3. Note that this threshold value TH1 is set or adjusted by the designer or user to provide a softer/harder dot output. The above is represented mathematically by the following:

The threshold setting is $0<TH1<255$;

$0<=NT<TH1\rightarrow 2$;

$TH1<=NT<=255\rightarrow 3$.

If NT is negative, the threshold current pixel will output a pixel value of 0 or 1. In step 50, the absolute value of NT is compared to the threshold TH1 and if it is below the threshold TH1, a 1 is output in step 52. If the absolute value of NT is greater than the threshold TH1 and lower than 255, a 0 is output. This is represented mathematically below:

$0<=abs(NT)<TH1\rightarrow 1$;

$TH1<=abs(NT)<=255\rightarrow 0$.

After steps 48 and 52, the output value Y(n) is in step 54 either stored or used by the marking engine to provide a gray scale halftone variable sized dot at the location of the pixel. The output value Y(n) is scaled or mapped in step 56 to a value range between 0 and 255. For example, $s[0]=0$; $s[1]=85$; $s[2]=170$; $s[3]=255$. In step 58 the error is calculated by an addition of the input value X plus the error value Xe minus the scaled value of S[Y(n)]. This value E of the error is distributed to future pixels X1, X2, X3, X4 as shown in FIG. 3a and is divided among these future pixels to be processed. This is shown in step 60. Alternatively, the error E can be distributed to less than four pixels. The distribution can be equally weighted or with different weights. These choices can be made by the user to optimize the method for different applications.

Once the error has been distributed to all of the future pixels, and the output value Y(n) of the processed pixel X(n) has been provided to either storage or a marking engine, the process moves to the next pixel X(n+1) to be processed, in step 62, and then repeats the procedure starting at step 34. The procedure is repeated until all of the pixels are processed.

The above-described process may be readily implemented by one of ordinary skill in the art on conventional image processing hardware using dedicated circuits or by one or more computers suitably programmed.

Figure 6B:
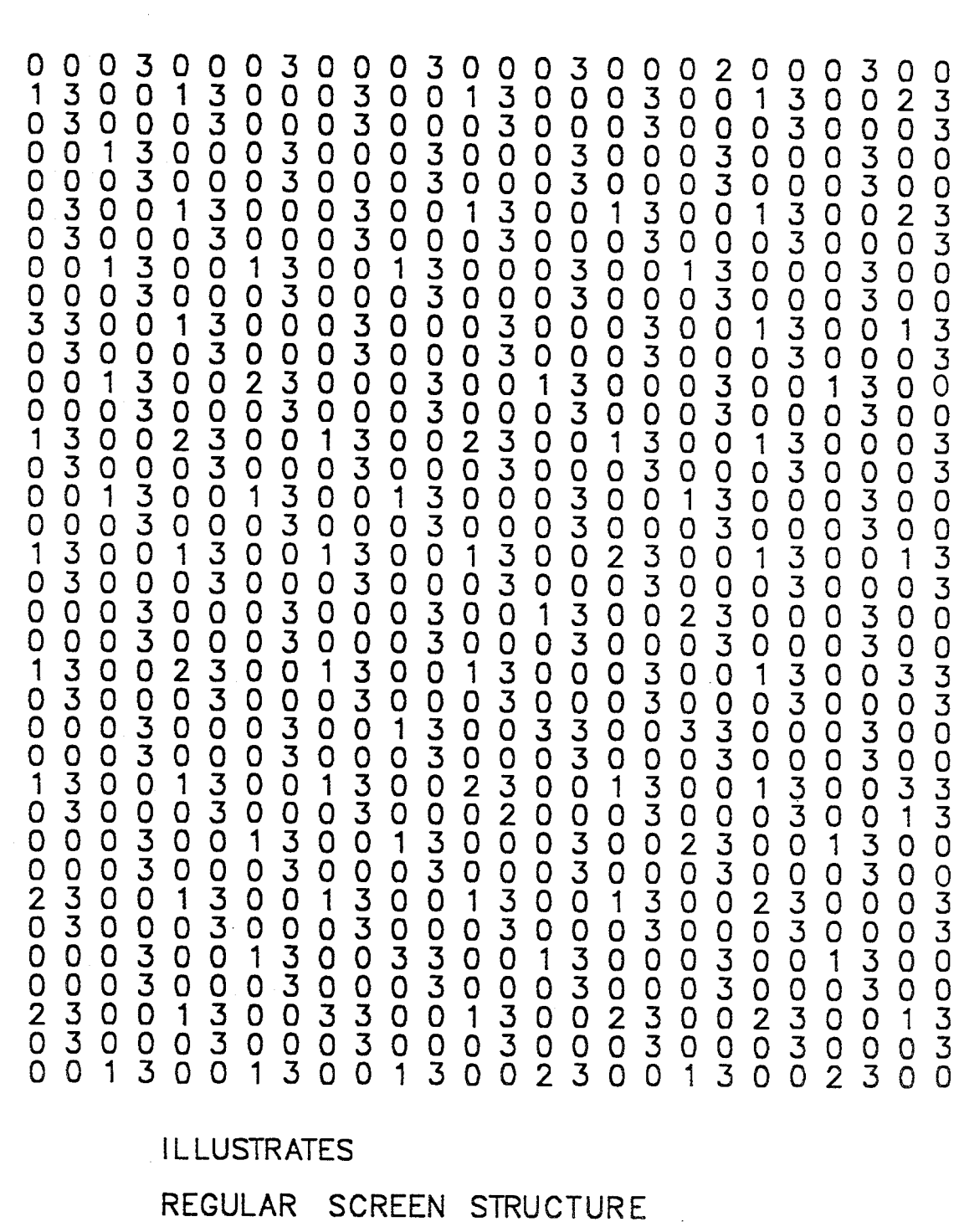

An exemplary bit map of a portion of an image, with pixel output values from 0–3 for each pixel, is illustrated in FIG. 6. The bit map is stored in the frame store 17 and/or provided to either the display 20 or the printer 18. In certain preferred embodiments, the printer 18 is an electrophotographic marking engine wherein an electrophotoconductive recording medium is electrostatically charged and the charge selectively imagewise modulated by a grey scale exposure source such as, for example, a laser or LED printhead. However, other marking engines are contemplated including electrographic, ink jet, thermal, photographic, etc.

As can be seen with the above described apparatus and method of the present invention, a multi-bit rendering is possible in which the screen is adjusted through a screen frequency component. Conventional error diffusion does not provide a cell structure. However, by use of a screen component as suggested by the invention, there is provided a tendency towards creating within the reproduced image a cell structure having at least one stable dot with maximum exposure within the cell. By adjustment of the screen control parameter (fp) cell or superpixel size and thus screen frequency can be changed and optimized for the electrophotographic process. By changing the threshold factors T1(n)—T3(n), one can adjust the softness/hardness of the dots. The threshold factors may be adaptively changed within an image to correct for areas that would otherwise be rendered with unstable dots. Thus, the processed values Y(n) for an area may be determined and if the resulting values determine a lack of stable dots in the area, the processed pixels are rendered using different threshold settings to provide for more stable pixels in the area. In process color printing wherein color separation images are created, the variability of screen frequency between the different color images is easily provided for by using different screen control parameters (fp). Additionally, due to the different toners or other process differences used for the different color separation images, stability of the dots can be adjusted for each color separation image through selection of different threshold factors.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method for modifying data representing a digitized image, the method comprising:
   a. receiving the data of a digitized image as signals representing input pixel values for a plurality of unprocessed pixels;
   b. selecting an unprocessed one of said pixels to be a current pixel for processing;
   c. thresholding a value associated with the current pixel wherein a thresholding operation employs a functional relationship that includes the input pixel value for the current pixel, an error value diffused from previously processed pixels to the current pixel, a screen control parameter and a parameter related to a sum of normalized previously processed pixels, to generate a processed pixel value for the current pixel;
   d. generating an error incurred in processing the current pixel to the processed pixel value, the error including a functional relationship of the processed pixel value for the current pixel, the error value diffused to the current pixel, the input pixel value for the current pixel and not additionally including the screen control parameter nor the parameter related to a sum of normalized previously processed pixels;
   e. distributing the error incurred in processing the current pixel to the processing of at least one other of said plurality of unprocessed pixels; and
   f. repeating steps b–e for processing each of the unprocessed pixels and using processed pixel values to generate signals representing a modified digital image.

2. The method of claim 1, wherein the screen control parameter is adjustable.

3. The method of claim 1, wherein the processed pixel value is a value represented by multiple bits.

4. The method of claim 3 and including the step of printing the modified digitized image.

5. The method of claim 1, wherein the error value is obtained by adding, with weighted factoring, errors incurred in processing previous pixels and distributed to the current pixel.

6. The method of claim 5 and including the step of printing the modified digitized image.

7. The method of claim 1, wherein the parameter related to a sum of normalized processed pixels is obtained by the steps of normalizing and shifting output pixel values of previously processed pixels and then summing normalized and shifted values to produce a screen frequency component, and the screen frequency component is scaled with the screen control parameter.

8. The method of claim 7 and wherein different screen control parameters are used for different color separation images in forming a processed color image.

9. The method of claim 8 and including the step of printing the modified digitized image.

10. The method of claim 7 and including the step of printing the modified digitized image.

11. The method of claim 1, further comprising adjusting threshold values for the step of thresholding to adjust a softness/hardness characteristic of a processed pixel.

12. The method of claim 11 and including the step of adjusting threshold values in an area wherein the modified image is determined to render unstable dots and reprocessing the pixels in that area with adjusted threshold values.

13. The method of claim 12 and including the step of printing the modified digitized image.

14. The method of claim 1 and including the step of printing the modified digitized image.

15. The method of claim 1, and including the step of storing the processed pixel values in a memory.

16. The method of claim 1, and including the step of providing the processed pixel values to a marking device.

17. The method of claim 1, wherein the processed pixel values are multiple bit values.

18. The method of claim 1, further comprising adjusting thresholding criteria to adjust a softness/hardness characteristic of a processed pixel.

19. The method of claim 1, wherein the step of distributing the error incurred includes dividing the error incurred among a plurality of unprocessed pixels.

20. The method of claim 19, wherein the dividing of the error incurred among the plurality of unprocessed pixels is performed in accordance with a weighted distribution.

21. An apparatus for modifying data representing a digitized image, the method comprising:
   a. means for receiving the data of a digitized image as signals representing input pixel values for a plurality of unprocessed pixels;
   b. means for selecting an unprocessed one of said pixels to be a current pixel for processing;
   c. means for thresholding a value associated with the current pixel wherein a thresholding operation employs a functional relationship that includes the input pixel value for the current pixel, an error value diffused from previously processed pixels to the current pixel, a screen control parameter and a parameter related to a sum of normalized previously processed pixels, to generate a processed pixel value for the current pixel;
   d. means for generating an error incurred in processing the current pixel to the processed pixel value, the error including a functional relationship of the processed pixel value for the current pixel, the error value diffused to the current pixel, the input pixel value for the current pixel, and not additionally including the screen control parameter nor the parameter related to a sum of normalized previously processed pixels;

e. means for distributing the error incurred in processing the current pixel to the processing of at least one other of said plurality of unprocessed pixels; and f. means for repeating steps b–e for processing each of the unprocessed pixels and using processed pixel values to generate signals representing a modified digital image.

* * * * *